United States Patent
Battle et al.

(10) Patent No.: US 11,205,914 B2
(45) Date of Patent: Dec. 21, 2021

(54) BATTERY CHARGING DEVICE AND CHARGING CONTROL METHOD THEREFOR

(71) Applicant: Samsung Electronics Co., Ltd., Suwon-si (KR)

(72) Inventors: Jason Battle, Suwon-si (KR); Ki-young Kim, Yongin-si (KR); Khandelwal Ashish, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 16/065,559

(22) PCT Filed: Jul. 18, 2016

(86) PCT No.: PCT/KR2016/007809
§ 371 (c)(1),
(2) Date: Jun. 22, 2018

(87) PCT Pub. No.: WO2017/111238
PCT Pub. Date: Jun. 29, 2017

(65) Prior Publication Data
US 2021/0175736 A1    Jun. 10, 2021

(30) Foreign Application Priority Data

Dec. 23, 2015  (KR) .................... 10-2015-0184526

(51) Int. Cl.
*H02J 7/00*        (2006.01)
*H01M 10/44*   (2006.01)

(52) U.S. Cl.
CPC ....... *H02J 7/007182* (2020.01); *H01M 10/44* (2013.01); *H02J 7/0047* (2013.01)

(58) Field of Classification Search
CPC ............... H02J 7/007182; H02J 7/0047; H02J 7/00047; H01M 10/44; H01M 10/46
(Continued)

(56) References Cited

U.S. PATENT DOCUMENTS 5,684,382 A * 11/1997 Fritz ................... H02J 7/00036
320/164
6,137,280 A * 10/2000 Ackermann ........ H02J 7/00047
323/354

(Continued)

FOREIGN PATENT DOCUMENTS

JP    2002/343441 A    11/2002
JP    2003/032909 A    1/2003

(Continued)

*Primary Examiner* — Edward Tso
*Assistant Examiner* — Aaron Piggush
(74) *Attorney, Agent, or Firm* — Jefferson IP Law, LLP

(57) ABSTRACT

The present invention relates to a battery charging device and a charging control method thereof, the battery charging device including: a charger configured to provide a charging voltage for charging a battery; at least one processor configured to control the charger; and a variable resistor placed on a charging path and configured to adjust a charging capacity provided from the charger to the battery and have a resistance determined corresponding to a digital code received from the processor, wherein the processor corrects the digital code to be output to the variable resistor in accordance with battery charging characteristics monitored during a charging cycle of the battery. Thus, flexible and adaptive charging control is possible through at least one digital variable resistor provided in the charging device, and error situations are handled in real time by correcting the digital code through monitoring in a charging process.

15 Claims, 12 Drawing Sheets

(58) Field of Classification Search
USPC .................................. 320/134, 137, 160, 163
See application file for complete search history.

(56) References Cited

U.S. PATENT DOCUMENTS

| | | |
|---|---|---|
| 8,710,803 B2 | 4/2014 | Huang et al. |
| 8,841,879 B2 | 9/2014 | Belz |
| 2011/0215770 A1 | 9/2011 | Belz |
| 2013/0076312 A1 | 3/2013 | Huang et al. |
| 2014/0236511 A1 | 8/2014 | Kulkarni et al. |
| 2014/0340044 A1* | 11/2014 | Kim ..................... H02J 7/0016 320/134 |
| 2015/0137598 A1 | 5/2015 | Hawawinni et al. |

FOREIGN PATENT DOCUMENTS

| | | |
|---|---|---|
| JP | 2015/027137 A | 2/2015 |
| KR | 10-0715401 B1 | 5/2007 |
| KR | 10-2012-0091833 A | 8/2012 |

\* cited by examiner

BATTERY CHARGING DEVICE AND CHARGING CONTROL METHOD THEREFOR

TECHNICAL FIELD

The present invention relates to a battery charging device and a charging control method thereof, and more particularly to a battery charging device using a digital variable resistor and a charging control method thereof.

BACKGROUND ART

With advancement of electronic technology, various types of electronic products have been developed and distributed. For example, use of various mobile terminals such as a smart phone, a smart pad (tablet), a personal digital assistant (PDA), etc. has been gradually increased, and accordingly a charging device for charging a battery provided in such a terminal has been also used a lot.

A battery charging device may be provided with a controller for controlling a charging amount. The controller may use a digital or analog method to perform control, and may for example use a method of updating charging settings by monitoring battery characteristics with a voltage caused by a current flowing in a resistor provided in the charging device, changing a reference voltage, or the like method to control battery charging.

In such a process of controlling the battery charging, an error may occur by various causes such as component tolerance, temperature drift, noise, circuit parasitics, etc.

Such an error may for example cause prolonged battery charging time, loss of usable battery capacity/runtimes, triggering of safety faults, progressive battery damage, etc. and therefore there is a need of correcting an error caused when controlling the battery charging.

DISCLOSURE

Technical Solution

According to one embodiment of the present invention, a battery charging device includes a charger configured to provide a charging voltage for charging a battery; at least one processor configured to control the charger; and a variable resistor placed on a charging path and configured to adjust a charging capacity provided from the charger to the battery and have a resistance determined corresponding to a digital code received from the processor, wherein the processor corrects the digital code to be output to the variable resistor in accordance with battery charging characteristics monitored during a charging cycle of the battery. Thus, simple control is made to correct the resistance of the variable resistor, and therefore real-time charging control is possible according to charging characteristics.

The variable resistor may include a first resistor configured to make a charging current be subjected to constant current control; and a second resistor configured to make a charging voltage be subjected to constant voltage control. Thus, accurate CC-CV charging control is made.

The processor may update a first digital code to be output to the first resistor and a second digital code to be output to the second resistor based on a linear scaling factor. Thus, it is possible to support simple digital code correction using an expression.

The first digital code may be determined by an expression $$\text{ICTL\_RHEOSTAT\_CODE} = \frac{\text{RHEO\_RESOL} * \text{TOP\_RES}}{\text{RHEO\_FS\_RES} * \left(\frac{VREF}{ICHG \cdot RSNS \cdot \text{CURR\_GAIN}} - 1\right)},$$

where, RHEOSOL_RESOL has a predetermined bit value given for setting a charging current, TOP_RES is a resistance per upper static resistor of the first resistor, RHEO_FS_RES is an end-to-end resistance of the first resistor, VREF is a set value of a reference voltage, ICHG is a target charging current, RSNS is a current sense resistance, and CURR_GAIN is a current sense amplifier gain. Thus, the resistance settings are made according to the codes of the variable resistor for the constant current control.

The determined first digital code may be updated by one of an expression

If $\frac{\text{VREF\_MEAS}}{\text{VICHG\_MEAS}} < \frac{VREF}{VICHGSET}$, $$\text{ICTL\_RHEO\_NEW} = \text{ICTL\_RHEO\_OLD} * \left(1 + \left(\frac{VICHGSET}{VREF} + \frac{\text{VREF\_MEAS}}{\text{VICHG\_MEAS}}\right)\right) + 1$$

and an expression

If $\frac{\text{VREF\_MEAS}}{\text{VICHG\_MEAS}} > \frac{VREF}{VICHGSET}$, $$\text{ICTL\_RHEO\_NEW} = \text{ICTL\_RHEO\_OLD} * \left(1 - \left(\frac{VICHGSET}{VREF} + \frac{\text{VREF\_MEAS}}{\text{VICHG\_MEAS}}\right)\right) + 1,$$

where, ICTL_RHEO_OLD is a first digital code before correction, ICTL_RHEO_NEW is a first digital code after correction, VREF_MEAS is a measured reference voltage, VICHG_MEAS is a measured charging voltage, VREF is a set reference voltage, and VICHGSET is a set charging voltage value. Thus, the digital code is corrected through real-time monitoring.

The second digital code may be determined by an expression $$\text{VCTL\_RHEOSTAT\_CODE} = \frac{\text{RHEO\_RESOL} * \text{TOP\_RES}}{\text{RHEO\_FS\_RES} * \left(\frac{VCHG}{VFB} - 1\right)},$$

where, RHEOSOL_RESOL has a predetermined bit value given for setting a charging current, TOP_RES is a resistance per upper static resistor of the second resistor, RHEO_FS_RES is an end-to-end resistance of the second resistor, VFB is a feedback voltage, and VCHG is a target charging voltage. Thus, the resistance settings are made according to the codes of the variable resistor for the constant current voltage.

The determined second digital code may be updated by one of an expression

If $\frac{\text{VCHG\_MEAS}}{\text{VFB\_MEAS}} < \frac{VCHG}{VFB}$,

-continued
$$\text{VCTL\_RHEO\_NEW} = \text{VCTL\_RHEO\_OLD} * \left(1 + \left(\frac{VFR}{VCHG} + \frac{VCHG\_MEAS}{VFB\_MEAS}\right)\right) + 1$$

and an expression

If $\frac{VCHG\_MEAS}{VFB\_MEAS} > \frac{VCHG}{VFB}$, $$\text{VCTL\_RHEO\_NEW} = \text{VCTL\_RHEO\_OLD} * \left(1 - \left(\frac{VFR}{VCHG} + \frac{VCHG\_MEAS}{VFB\_MEAS}\right)\right) + 1,$$

where, VCTL_RHEO_OLD is a second digital code before correction, VCTL_RHEO_NEW is a second digital code after correction, VCHG_MEAS is a measured charging voltage, VFB_MEAS is a measured feedback voltage, VCHG is a set charging voltage, and VFB is a set feedback voltage. Thus, the digital code is corrected through real-time monitoring.

At least one of the first resistor and the second resistor may include a digital variable resistor of which resistance settings are varied depending on the digital code. Thus, the charging control is made based on at least one of the constant voltage and the constant current.

One of the first resistor and the second resistor may be a digital variable resistor of which resistance setting is varied depending on the digital code, and the other one may have a fixed resistance. Thus, one digital variable resistor is enough to perform real-time charging control.

The processor may update the digital code to compensate for deviations corresponding to an abnormal increasing or decreasing charging capacity provided to the battery, based on monitoring results, and the resistance settings for the variable resistor may be changed in response to the update of the digital code. Thus, both the under-programming and over-programming situations are handled.

Meanwhile, according to another embodiment of the present invention, a battery charging device includes a charger configured to provide a charging voltage for charging a battery; at least one processor configured to control the charger; and first and second resistors placed on a charging path and configured to adjust a charging capacity provided from the charger to the battery, wherein one of the first and second resistors including a digital variable resistor having a resistance determined corresponding to a digital code received from the processor, and the processor corrects the digital code to be output to at least one of the first resistor and the second resistor in accordance with battery charging characteristics monitored during a charging cycle of the battery. Thus, real-time charging control is possible according to charging characteristics by correcting the resistance of the variable resistor for performing constant-current and constant-voltage charging control.

Meanwhile, according to one embodiment of the present invention, a charging control method of a battery charging device, including: a step of determining a resistance corresponding to a digital code received from at least one processor, with regard to a variable resistor placed on a charging path of the battery charging device and configured to adjust a charging capacity provided to the battery; and a step of correcting a digital code to be output to the variable resistor in accordance with battery charging characteristics monitored during a charging cycle of the battery. Thus, simple control is made to correct the resistance of the variable resistor, and therefore real-time charging control is possible according to charging characteristics.

The variable resistor may include a first resistor and a second resistor, and the step of correcting the digital code may include making a charging current be subjected to constant current control by the first resistor, and making a charging voltage be subjected to constant voltage control by the second resistor. Thus, accurate CC-CV charging control is made.

The step of correcting the digital code may include updating a first digital code to be output to the first resistor and a second digital code to be output to the second resistor based on a linear scaling factor. Thus, it is possible to support simple digital code correction using an expression.

The first digital code in the step of determining the resistance may be determined by an expression $$\text{ICTL\_RHEOSTAT\_CODE} = \frac{RHEO\_RESOL * TOP\_RES}{RHEO\_FS\_RES * \left(\frac{VREF}{ICHG * RSNS * CURR\_GAIN} + 1\right)},$$

where, RHEOSOL_RESOL has a predetermined bit value given for setting a charging current, TOP_RES is a resistance per upper static resistor of the first resistor, RHEO_FS_RES is an end-to-end resistance of the first resistor, VREF is a set value of a reference voltage, ICHG is a target charging current, RSNS is a current sense resistance, and CURR_GAIN is a current sense amplifier gain. Thus, the resistance settings are made according to the codes of the variable resistor for the constant current control.

The determined first digital code in the step of correcting the digital code may be updated by one of an expression If $\frac{VREF\_MEAS}{VICHG\_MEAS} < \frac{VREF}{VICHGSET}$, $$\text{ICTL\_RHEO\_NEW} = \text{ICTL\_RHEO\_OLD} * \left(1 + \left(\frac{VICHGSET}{VREF} + \frac{VREF\_MEAS}{VICHG\_MEAS}\right)\right) + 1$$

and

If $\frac{VREF\_MEAS}{VICHG\_MEAS} > \frac{VREF}{VICHGSET}$, $$\text{ICTL\_RHEO\_NEW} = \text{ICTL\_RHEO\_OLD} * \left(1 - \left(\frac{VICHGSET}{VREF} + \frac{VREF\_MEAS}{VICHG\_MEAS}\right)\right) + 1,$$

where, ICTL_RHEO_OLD is a first digital code before correction, ICTL_RHEO_NEW is a first digital code after correction, VREF_MEAS is a measured reference voltage, VICHG_MEAS is a measured charging voltage, VREF is a set reference voltage, and VICHGSET is a set charging voltage value. Thus, the digital code is corrected through real-time monitoring.

The second digital code in the step of determining the resistance value may be determined by an expression $$\text{VCTL\_RHEOSTAT\_CODE} = \frac{\text{RHEO\_RESOL} * \text{TOP\_RES}}{\text{RHEO\_FS\_RES} * \left(\frac{VCHG}{VFB} - 1\right)},$$

where, RHEOSOL_RESOL has a predetermined bit value given for setting a charging current, TOP_RES is a resistance per upper static resistor of the second resistor, RHEO_FS_RES is an end-to-end resistance of the second resistor, VFB is a feedback voltage, and VCHG is a target charging voltage. Thus, the resistance settings are made according to the codes of the variable resistor for the constant current voltage.

The determined second digital code in the step of correcting the digital code may be updated by one of an expression $$\text{If } \frac{\text{VCHG\_MEAS}}{\text{VFB\_MEAS}} < \frac{VCHG}{VFB}, \text{VCTL\_RHEO\_NEW} =$$

$$\text{VCTL\_RHEO\_OLD} * \left(1 + \left(\frac{VFB}{VCHG} * \frac{\text{VCHG\_MEAS}}{\text{VFB\_MEAS}}\right)\right) + 1 \text{ and}$$

$$\text{If } \frac{\text{VCHG\_MEAS}}{\text{VFB\_MEAS}} > \frac{VCHG}{VFB}, \text{VCTL\_RHEO\_NEW} =$$

$$\text{VCTL\_RHEO\_OLD} * \left(1 - \left(\frac{VFB}{VCHG} * \frac{\text{VCHG\_MEAS}}{\text{VFB\_MEAS}}\right)\right) + 1,$$

where, VCTL_RHEO_OLD is a second digital code before correction, VCTL_RHEO_NEW is a second digital code after correction, VCHG_MEAS is a measured charging voltage, VFB_MEAS is a measured feedback voltage, VCHG is a set charging voltage, and VFB is a set feedback voltage. Thus, the digital code is corrected through real-time monitoring.

At least one of the first resistor and the second resistor may include a digital variable resistor of which resistance settings are varied depending on the digital code. Thus, the charging control is made based on at least one of the constant voltage and the constant current.

The step of correcting the digital code may include updating the digital code to compensate for deviations corresponding to an abnormal increasing or decreasing charging capacity provided to the battery, based on monitoring results, and changing the resistance settings for the variable resistor in response to the update of the digital code. Thus, both the under-programming and over-programming situations are handled.

BEST MODE

Below, exemplary embodiments will be described with reference to accompanying drawings to such an extent as to be easily realized by a person having an ordinary knowledge in the art. The present inventive concept is not limited to the embodiments set forth herein, and may be materialized variously.

Terms to be used in the following descriptions will be selected as general terms currently used as widely as possible taking functions of elements into account, but may be varied depending on intent of those skilled in the art, precedents, the advent of new technology, etc. In particular, there may be a term voluntarily selected by the applicant. In this case, the meaning of the term will be explained in detail through the relevant detailed descriptions. Therefore, the terms set forth herein have to be read in light of its meaning and content throughout the following descriptions rather than naming.

In the following descriptions, terms such as "include" or "have" refer to presence of features, numbers, steps, operations, elements or combination thereof, and do not exclude presence or addition of one or more other features, numbers, steps, operations, elements or combination thereof.

A "portion" set forth herein refers to software or hardware such as a field-programmable gate array (FPGA) or an application-specific integrated circuit (ASIC), and performs certain roles. However, the meaning of the "portion" is not limited to software or hardware. The "portion" may be configured to be present in a storage medium for addressing or may be configured to reproduce one or more processors. For example, the "portion" includes software elements, object-oriented software elements, class elements, task elements and the like elements, and processes, functions, attributes, procedures, subroutines, segments of a program code, drivers, firmware, a microcode, a circuit, data, a database, data structures, tables, arrays and variables. The function provided in the elements and the "portions" may be carried out by combining fewer elements and "portions" or may be subdivided by additional elements and "portions".

For clarity of the present invention in association with the drawings, portions not directly related to the elements of the present invention may be omitted, and like numerals refer to like elements throughout.

Figure 1:
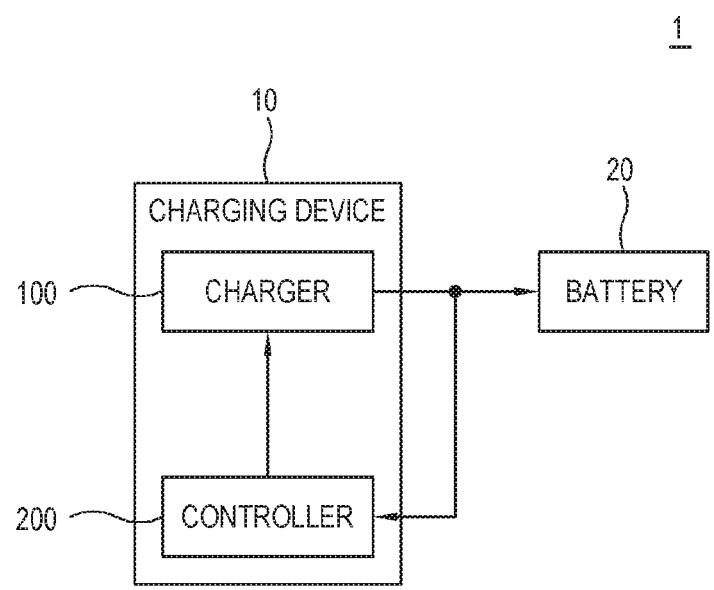
FIG. 1 is a block diagram of showing a battery charging system according to one embodiment of the present invention.

FIG. 1 is a block diagram of showing a battery charging system 1 according to one embodiment of the present invention.

As shown in FIG. 1, the battery charging system 1 according to one embodiment of the present invention includes an apparatus 10 for charging a battery and a battery 20 to be subjected to charging.

The battery charging device (hereinafter, also referred to as a charging device) 10 includes a charger 100 for supplying a charging voltage for charging a battery, and a charging controller (hereinafter, also referred to as a controller) 100 for controlling the charger 100.

The battery 20 is charged with the charging voltage received from the charging device 10, and supplies power for operations of various devices. The battery 20 is a secondary battery that is rechargeable, and may for example include a lithium (Li)-ion battery, a Li-polymer battery, etc. In the present invention, there are no limits to the kinds of battery 20.

According to one embodiment, the battery 20 charged by the charging device 10 is mounted to various electronic devices (not shown) including a mobile terminal and supplies power for operations. In the present invention, there are no limits to the kind of electronic device to which the battery 20 is mounted.

According to one embodiment of the present invention, the battery charging device 10 may be materialized by a portable charging device that receives power from the outside and charging a battery being mounted to and/or being separated from the electronic device. To this end, the battery charging device 10 is provided with an interface (not shown) capable of transmitting and receiving a signal to and from the battery and/or the electronic device mounted with the battery. Further, according to another embodiment, the battery charging device 10 may be materialized by a desktop computer, a laptop computer, a smart TV, etc. and for example use a universal serial bus (USB) interface to charge a battery being mounted to and/or being separated from the electronic device.

According to one embodiment, the charger 100 may be achieved by a charger integrated circuit (IC) for a high voltage charging current, for example, 10 A or higher.

The controller 200 detects, i.e. senses voltage, current or temperature from the battery, and controls the charger 100 to adjust the charging amount for the battery 20.

According to one embodiment of the present invention, the battery charging device 10 may further include a variable resistor 300.

Figure 2:
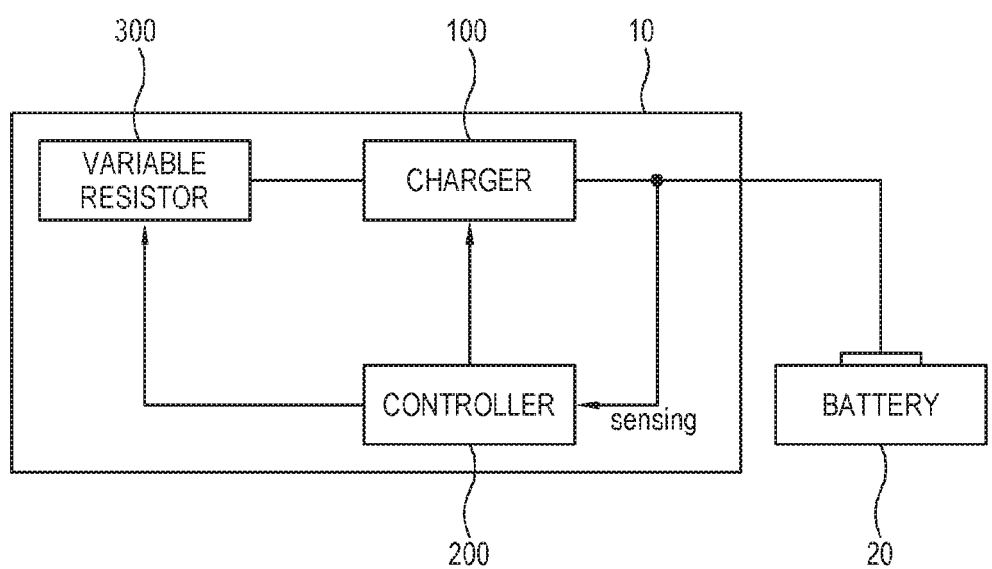
FIG. 2 is a block diagram of showing a configuration of a battery charging system further including a variable resistor.

FIG. 2 is a block diagram of showing a configuration of a battery charging system further including a variable resistor 300.

As shown in FIG. 2, the variable resistor 300 is positioned on a charging path and has a predetermined resistance value under control of the charging controller 200.

According to one embodiment of the present invention, the variable resistor 300 may be for example materialized by a digital rheostat or a digital potentiometer, as a digital variable resistance that operates digitally. Here, the digital variable resistor may function as a kind of adjustable voltage divider.

The variable resistor 300 may for example adjust resistance setting (hereinafter, also referred to as setting) based on a digital code received from the controller 200. To this end, the controller 200 may include an inter-integrated circuit (I2C), a system management bus (SMBus), or the like interface for outputting a control signal to the variable resistor 300.

For fast charging of batteries, increased charging current has to be applied to the battery. Typically, tradeoffs exist between reduction in overall charging time and deleterious impact on battery cycle life. In order to mitigate the damaging effects of high-rate charging, a variety of dynamic charging profiles may be used with varying the applied charging current and/or voltage based on time, voltage, temperature, state-of-charge (SOC), capacity, etc.

To implement the dynamic charging profiles, a battery charger IC that is programmable via a digital interface such as I2C, SMBus, etc. and a host microcontroller or a fuel gauge that updates charge settings based on monitored battery characteristics are required.

Alternatively, an analog programmable charger may be dynamically updated with external hardware, i.e. external circuitry that modifies the reference voltage (in a case of controlling charging current) or the sensed feedback voltage (in a case of controlling charging voltage).

The external circuitry designed to accomplish charge variation provides a pulse width modulation (PWM) signal, which is low-pass filtered via resistor and capacitor, as the reference voltage for a current sense error amplifier. Increase in the duty cycle of the PWM causes increase in the effective voltage impressed upon the reference voltage pin, and the charger IC responds to the increased error voltage with a higher charging voltage. On the other hand, the charging current decreases. This manner may be also applied to the voltage feedback pin to alter the charging voltage.

Since the feedback pin voltage has to be continuously updated to maintain a target gain relationship between battery voltage and feedback voltage, and a gain is dependent on a target charging voltage, there is a disadvantage in ease of charging voltage updates. Thus, a source (e.g. a microcontroller) of the PWM signal has less time available to reside in lower power states, increasing average power consumption.

Further, noise and ripple contribution may incur using an alternating current (AC) waveform to approximate a direct current (DC) voltage. To decrease the ripple contribution, a higher PWM frequency may be employed. However, the higher PWM frequency may add complexity to routing and shielding requirements in a layout phase of a printed circuit board (PCB). On the other hand, a lower PWM frequency improves noise concerns but carries implications with respect to RC filter design, necessitating higher resistance and/or capacitance values that can affect component cost and size.

According to another embodiment, switched resistors may be employed in a feedback voltage divider structure to alter the voltage gain characteristic such that higher or lower charging currents or voltages are enforced per the regulation loops.

Parallel resistors may be multiplexed into or out of the voltage divider entirely or cumulative resistance added to base resistance based on a fixed step size, which is similar to a digital-to-analog converter topology such as a string digital-to-analog converter (DAC). Such techniques are used in dynamic output voltage applications where requests to increase the output voltage are answered by changing the resistor ratio in a feedback circuit of a flyback converter, altering its target output voltage.

Such a method is simple and cost-effective for a tightly constrained array of possible charge parameter values, but quickly loses all benefits when scaling its use to accommodate numerous settings since a separate field effect transistor (FET) switch and resistor are needed for a voltage feedback circuit.

Meanwhile, the foregoing charging control methods are required to correct errors that may occur in the programmed voltage due to problems with component tolerance, temperature drift, noise, circuit parasitics, or the like.

Such an error may for example cause problems of prolonged battery charging time, loss of usable battery capacity/runtime, triggering of safety faults, and progressive battery damage.

FIGS. 3 to 6 are views of showing comparison between a case where the digital variable resistor 300 according to one embodiment of the present invention is under-programmed and a normal case.

Referring to FIG. 3 to FIG. 6, the variable resistor 300 may require high rate (2C or 2× battery capacity) charging and exhibit issues as a result of rheostat under-programming.

When the error is not corrected, the battery is undercharged at the end t2 of the charging cycle, suffering an ~11% charge time increase (t2) and ~about 5% loss in usable capacity.

Figure 3:
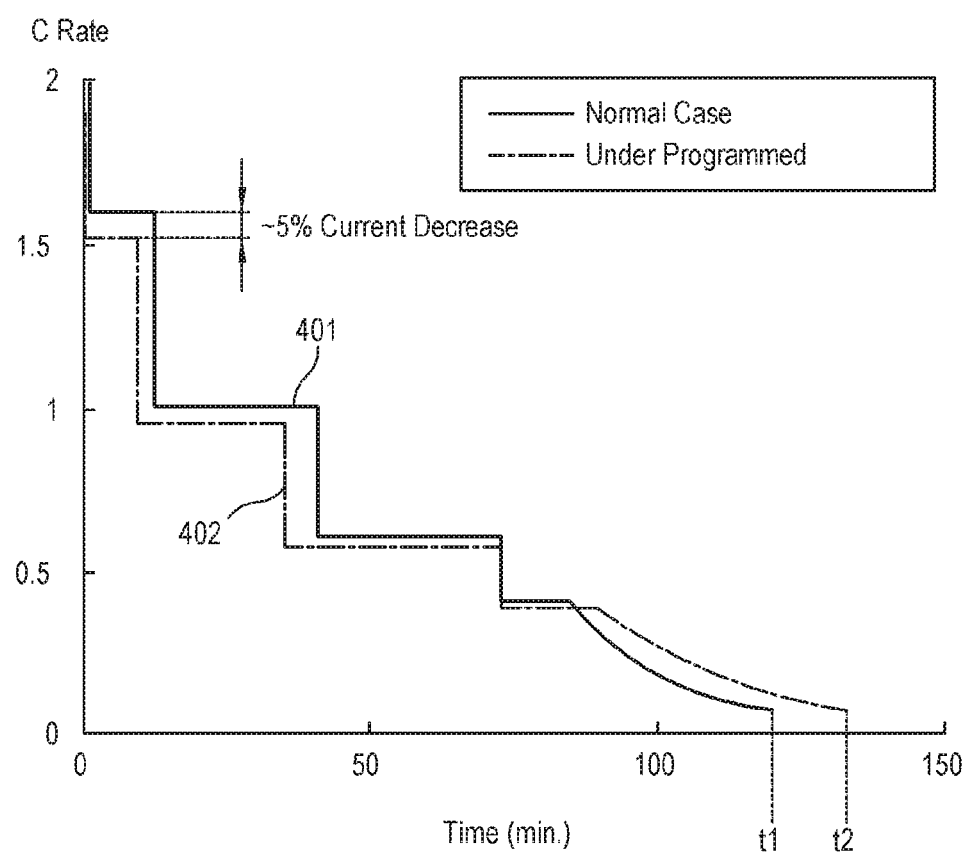
FIGS. 3 to 6 are views of showing comparison between a case where a digital variable resistor according to one embodiment of the present invention is under-programmed and a normal case.

Specifically, as shown in FIG. 3, the charging rate (C Rate) 402 of when the variable resistor 300 is underprogrammed causes the current to be more decreased by about 5% than the charging rate (C Rate) 401 of a normal case, and it is therefore understood that the charge time increases as much as t2−t1.

Figure 4:
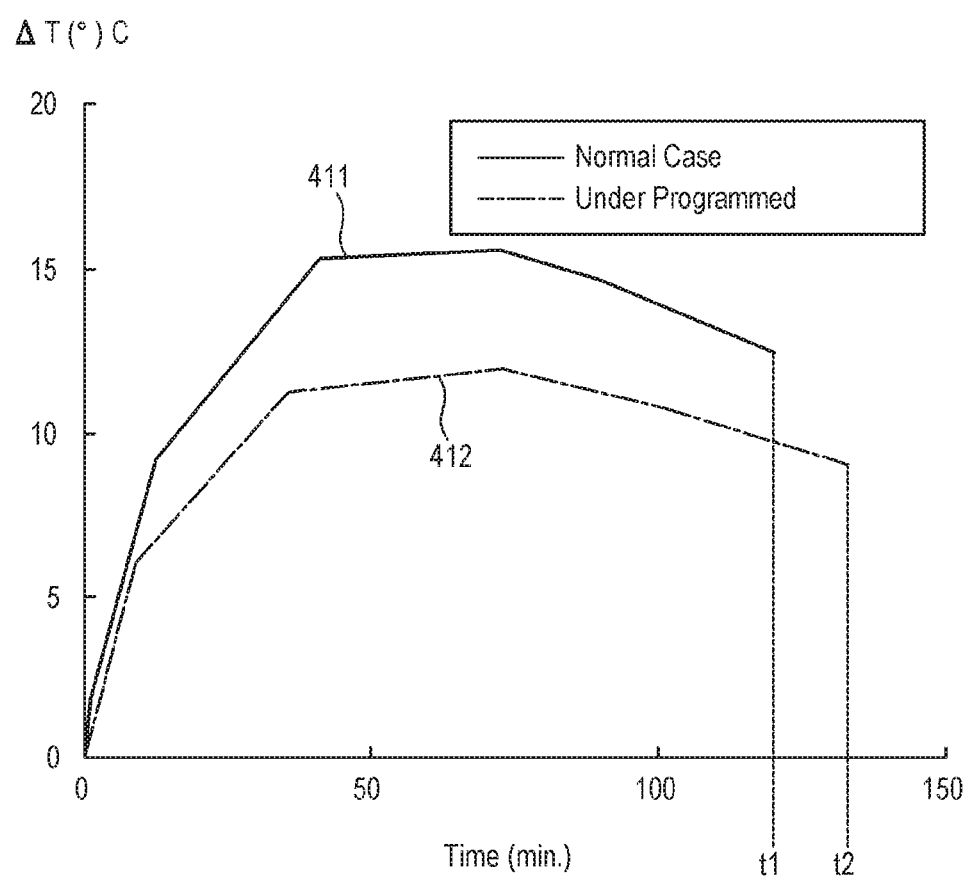

Likewise, referring to FIG. 4, the temperature (ΔT) of the battery in a case 412 where the variable resistor 300 is under-programmed is lower than that in a normal case 411.

Figure 5:
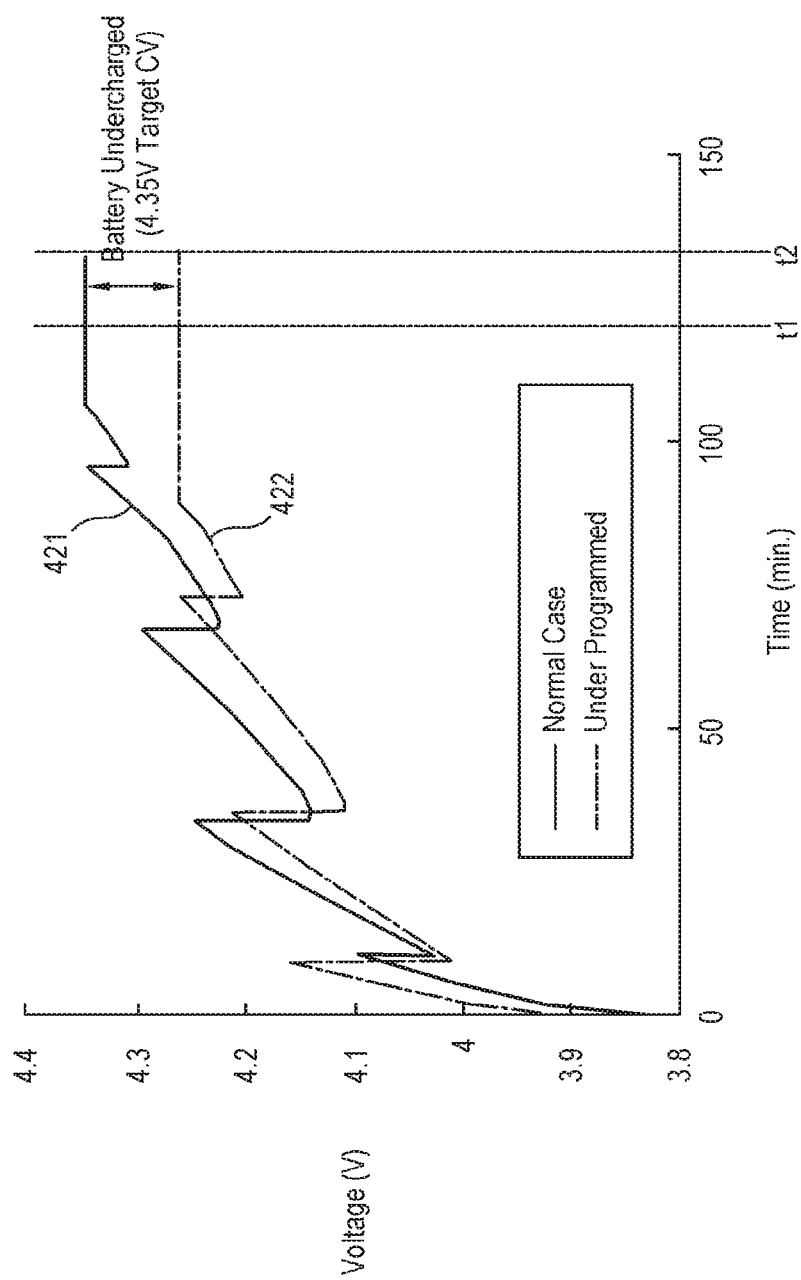

As shown in FIG. 5, the voltage level at the end t1 of the charging cycle in a case 422 where the variable resistor 300 is under-programmed is lower than a target constant voltage (e.g. 4.35V) in a normal case 421.

Figure 6:
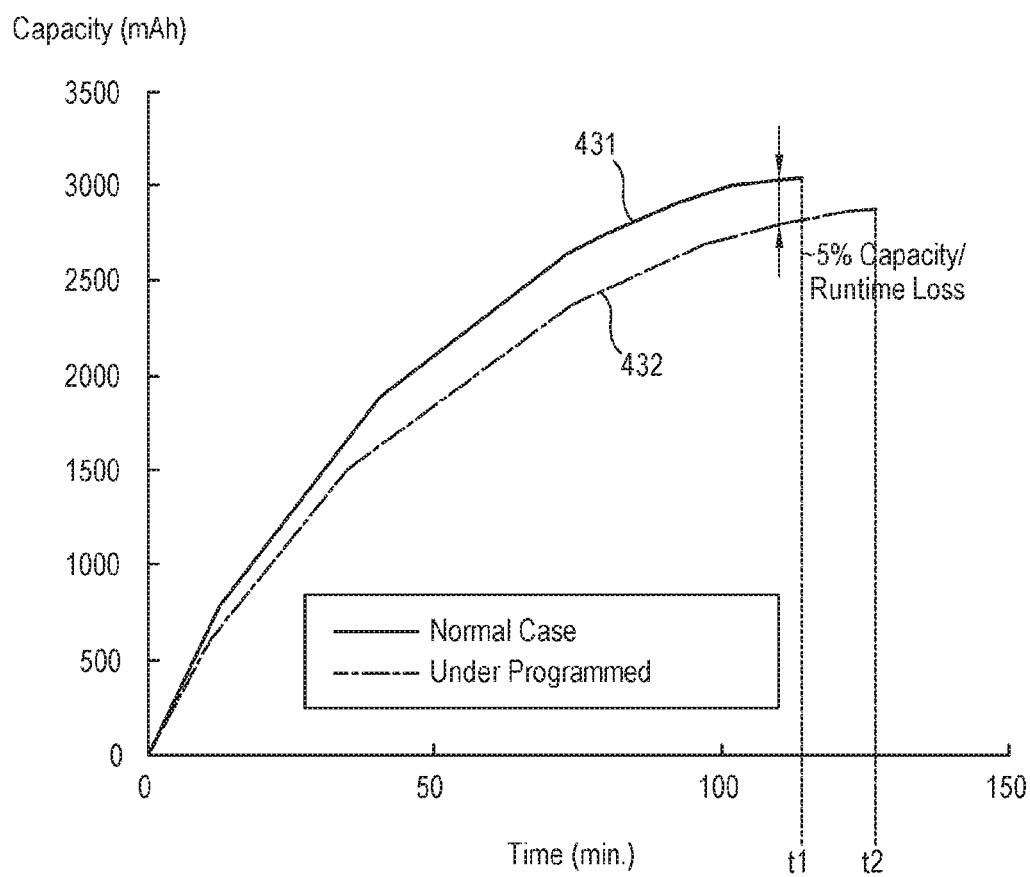

Further, as shown in FIG. 6, the charging capacity of the battery in a case 432 where the variable resistor 300 is under-programmed is lower than that in a normal case 431.

As described above, when the variable resistor 300 is under programmed, charging may be completed without fully using the usable battery capacity, or a user may have to prolong the battery charging time.

FIGS. 7 to 10 are views of showing comparison between a case where the digital variable resistor according to one embodiment of the present invention is over-programmed and a normal case.

Here, when the error is not corrected, the battery is overcharged at the end t4 of the charging cycle, causing an uncontrolled increase in a battery temperature by about 38% (ΔT1) and increase in a final battery voltage by more than about 100 mV, with the latter condition risking possible trigger of overvoltage protection hardware.

Figure 7:
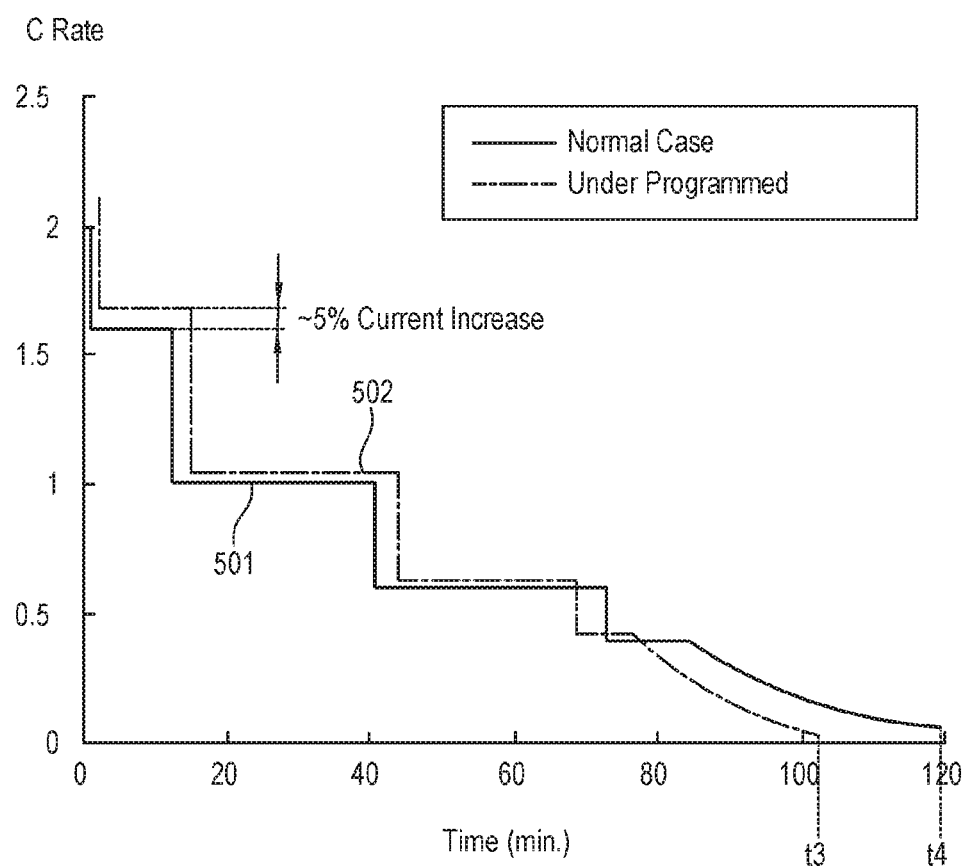
FIGS. 7 to 10 are views of showing comparison between a case where a digital variable resistor according to one embodiment of the present invention is over-programmed and a normal case.

Specifically, as shown in FIG. 7, the charging rate (C Rate) 502 of when the variable resistor 300 is over-programmed is higher than the charging rate 501 of a normal case, and it is therefore understood that the charging current increases.

Figure 8:
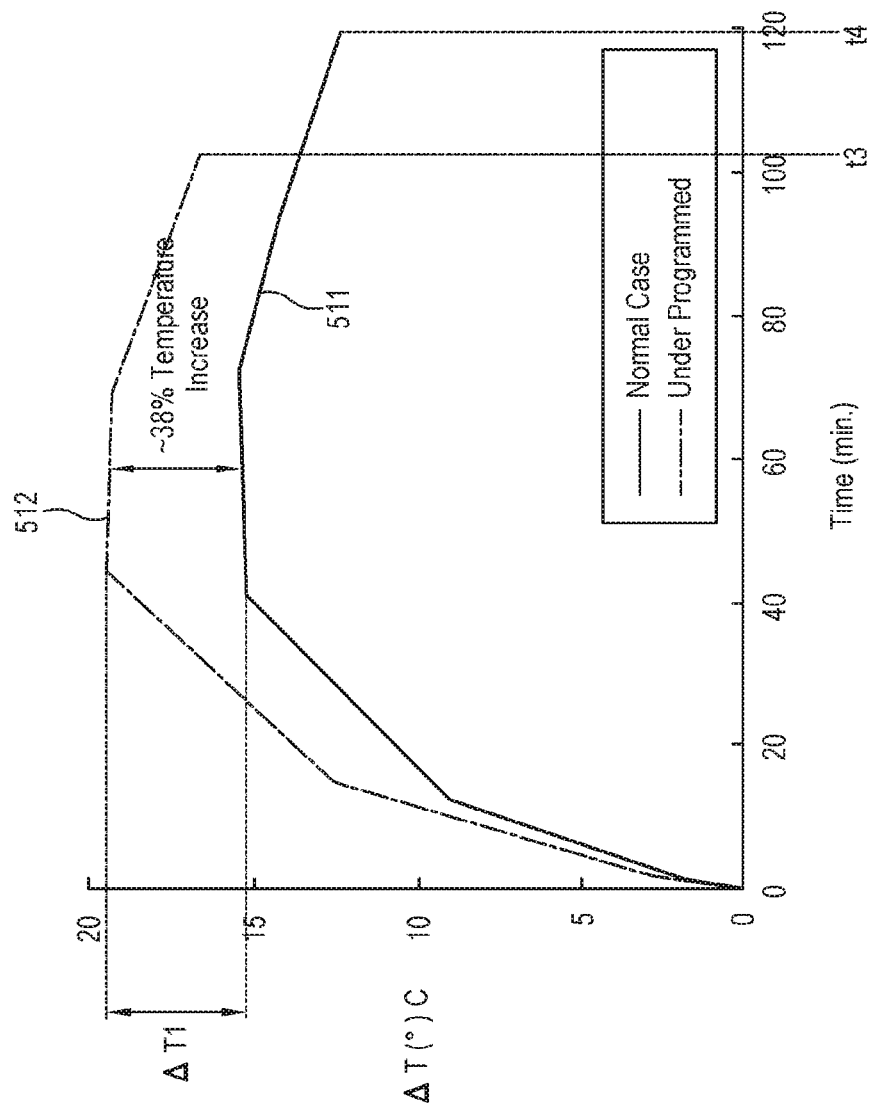

Likewise, referring to FIG. 8, the temperature (ΔT) of the battery in a case 512 where the variable resistor 300 is over-programmed is much higher than that in a normal case 511.

Figure 9:
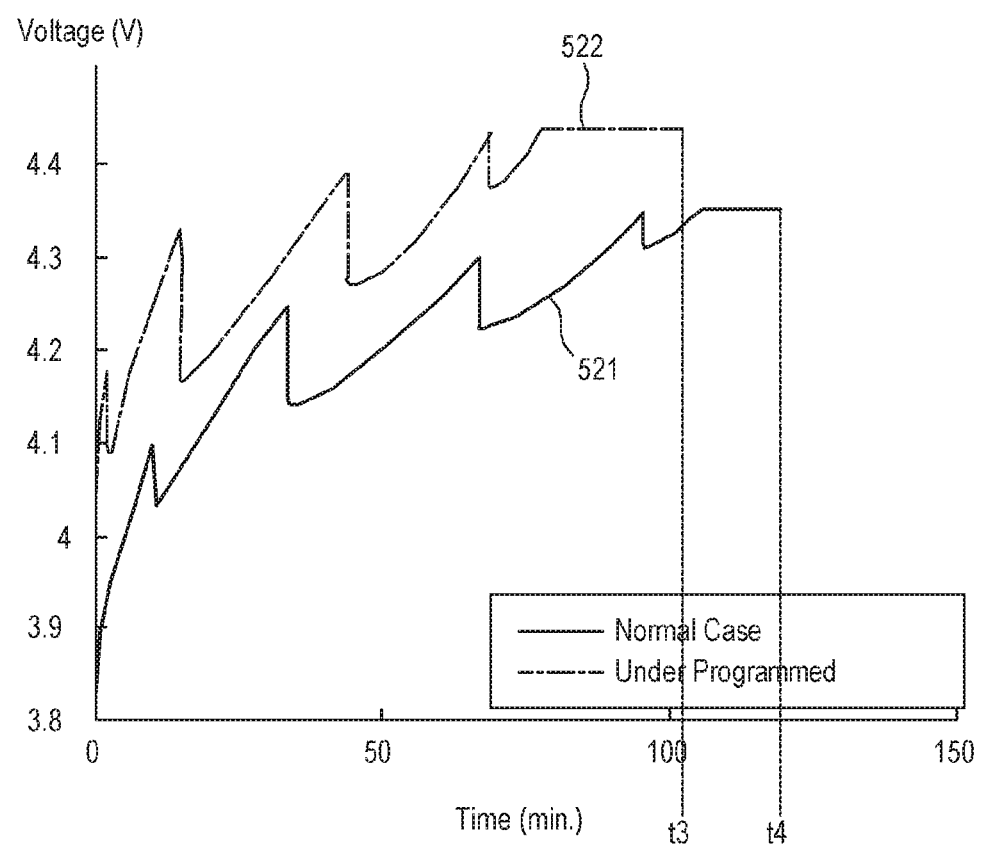

As shown in FIG. 9, the voltage level at the end t4 of the charging cycle in a case 522 where the variable resistor 300 is over-programmed is higher than a target constant voltage (e.g. 4.35V) in a normal case 521.

Figure 10:
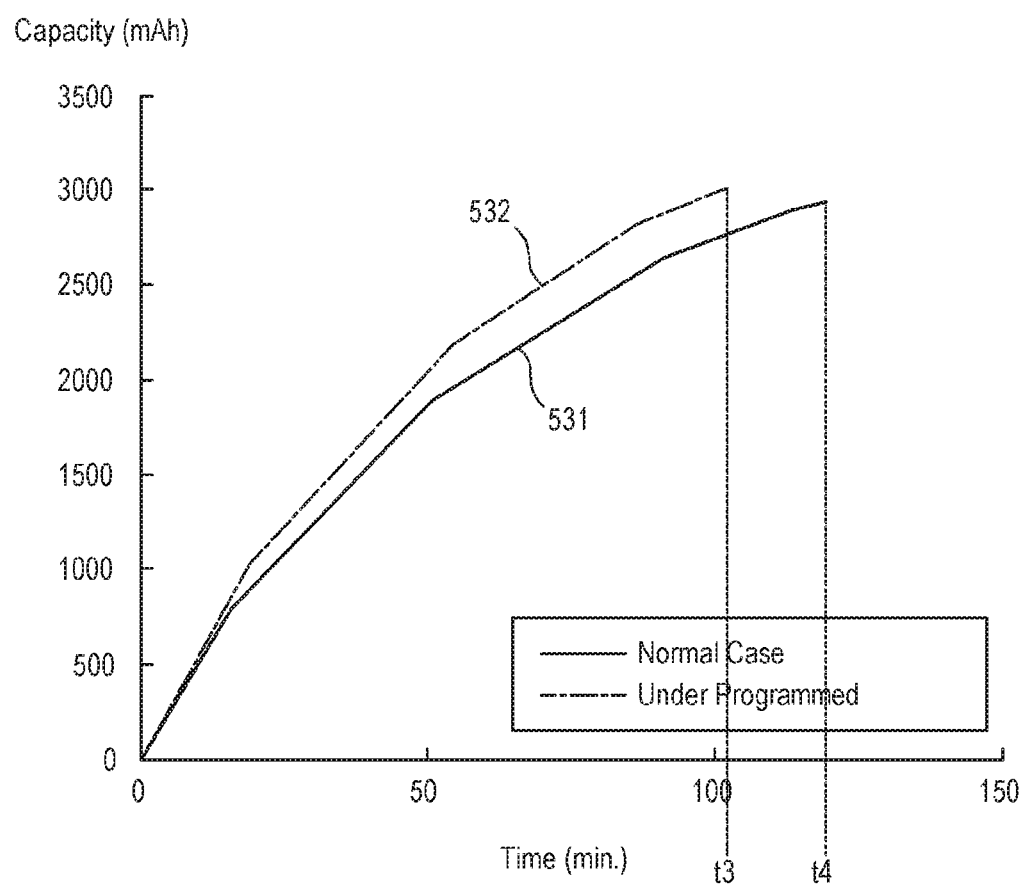

Further, as shown in FIG. 10, the charging capacity of the battery in a case 532 where the variable resistor 300 is over-programmed is higher than that in a normal case 531.

Such cases where the variable resistor 300 is over-programmed not only increase a total charging time due to safety hardware interruption of a charging process, but also repeatedly expose the battery to overly stressful conditions, with the cumulative effects having appreciable impact on battery performance and life.

In this regard, the battery charging device 10 according to one embodiment of the present invention may be configured to negate influence of errors on charging accuracy and performance.

Figure 11:
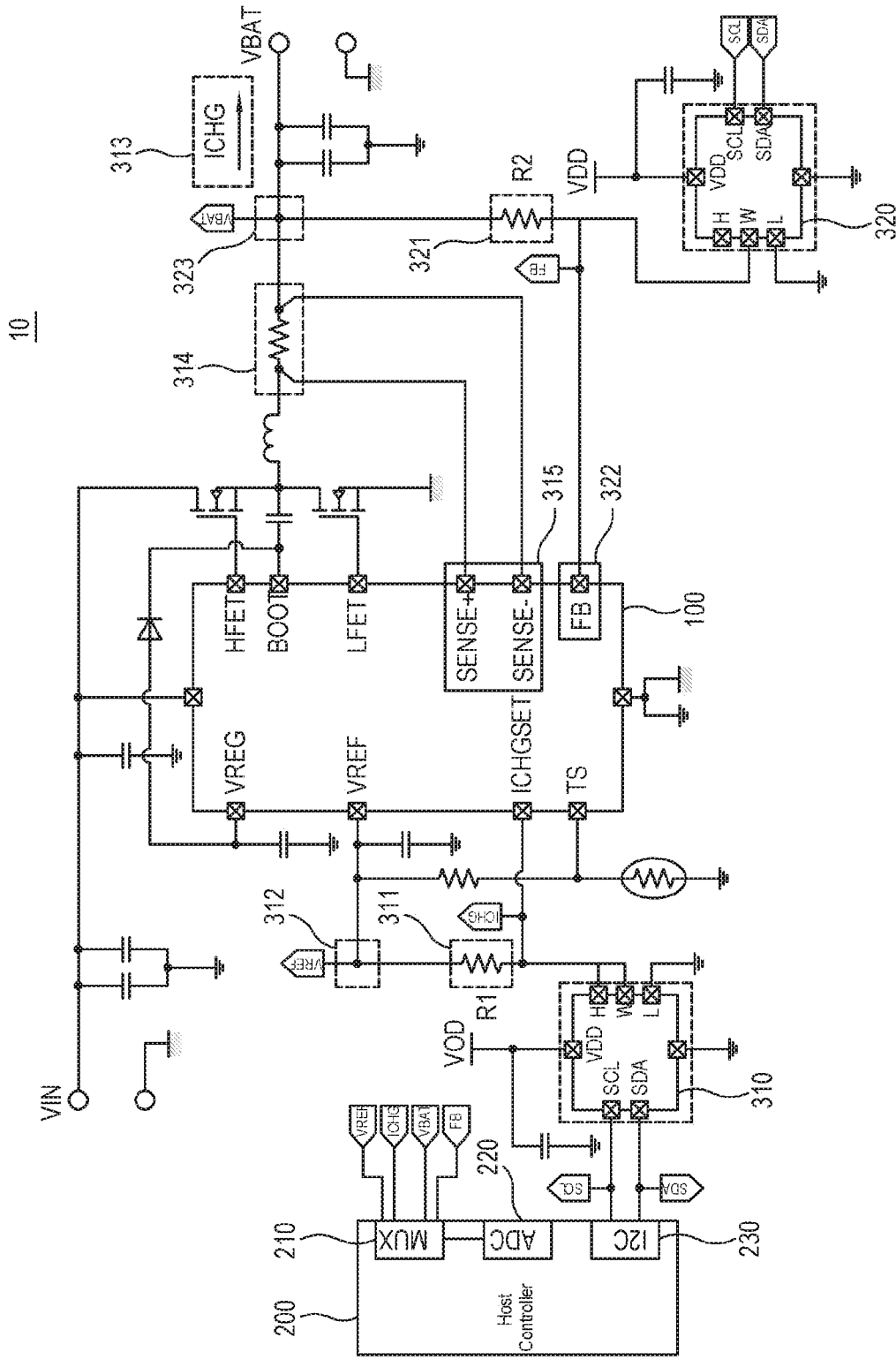
FIG. 11 is a circuit diagram of showing a more detailed configuration of a battery charging device according to one embodiment of the present invention.

FIG. 11 is a circuit diagram of showing a more detailed configuration of a battery charging device 10 according to one embodiment of the present invention, and As shown in FIG. 11, the battery charging device 10 according to one embodiment includes the charger 100 and the controller 200 like those of FIG. 1 and FIG. 2, and further includes a first resistor 310 and a second resistor 320 as the variable resistor 300.

As shown in FIG. 11, the controller 200 for controlling a charging amount of the charger 100 includes a multiplexer (MUX) 210 for receiving voltage or current as an analog value, an ADC 220 for converting the value received through the multiplexer 210 into a digital value, and an interface 230 for communicating with the first resistor 310 and the second resistor 320.

The controller 200 may control general operations of the charging device 10 and signal flow between internal components of the charging device 10, and process data. According to one embodiment, the controller 200 may be achieved by a host controller for generally controlling the charging device 10.

The controller 200 may include at least one processor (not shown). The processor according to one embodiment may include a general-purpose processor such as a central processing unit (CPU), an application processor (AP), a microcomputer (MICOM), etc., and may include a single-core processor, a dual-core processor, a triple-core processor, a quad-core processor, and the like multiple-core processor.

According to another embodiment, the controller 200 may include a chip provided as a processor dedicated for executing a program for adjusting the charging amount of the charger 100, for example, an integrated chip (IC).

According to still another embodiment, when the charging device 10 is a desktop or laptop computer, or a smart TV by way of example, the controller 200 may further include a read only memory (ROM) configured to store a control program for controlling the charging device 10, and a random access memory (RAM) configured to store a signal or data received from the outside of the charging device 10 or used as a storage area for various jobs performed in the charging device 10. In this case, the processor may be for example configured to perform various operations of the charging device 10 by loading and executing a corresponding program in accordance with a predetermined algorithm stored in the ROM.

Here, the processor may include a plurality of processors, for example, a main processor and a sub processor. The sub processor is provided to operate in a standby mode (hereinafter, referred to as a sleep mode) in which it is supplied with only standby power and does not operate to perform general functions. The processor, the ROM and the RAM may be connected to one another by an internal bus.

In this embodiment, the processor may further perform a function of a graphic processing unit (GPU) for a graphic process. For example, when the charging device 10 is a smart TV, the processor may be materialized by a system on chip (SoC) where the core and the GPU are coupled. Here, when the charging device 10 is a desktop computer or a laptop computer, the controller 200 may include a separate GPU for the graphic process.

The multiplexer 210, as shown in FIG. 11, receives a reference voltage VREF, a charging current ICHG, a battery voltage VBAT, and a feedback voltage FB.

The analog values received from the multiplexer 210 are converted by the ADC 220 into digital values.

The interface 230 is materialized by a serial or parallel interface, for example, an I2C as shown in FIG. 11. According to the present invention, the interface refers to a digital interface capable of communicating with the first resistor 310 and/or the second resistor 320, and there are no limits to the kinds of interface.

The first resistor 310 and the second resistor 320 may be configured to have different resistance settings based on the digital code received through the interface 230.

According to one embodiment, the first resistor 310 and the second resistor 320 may have superior flexibility in various settings of the voltage with the minimum configuration and excellent granularity by integrating several hundred or more polysilicon or thin film resistors and associated switches in a long resistor "ladder".

Therefore, it is possible to remarkably reduce the needs for excessive external circuitry per multiple discretely switched resistances or special handling for noisy PWM signals.

According to one embodiment, two multi-bit digital potentiometers may be connected as the first resistor 310 and the second resistor 320 to the controller 200, and the two multi-bit digital registers are respectively provided to control the charging current and the charging voltage based on the setting values.

According to another embodiment, one of the first resistor 310 and the second resistor 320 may be replaced by a resistor having a 1% fixed value. In other words, in the variable resistor 300 according to the present invention, at least one of the first resistor 310 and the second resistor 320 is provided as the digital variable resistor, i.e. the digital potentiometer.

FIG. 11 illustrates that both the first resistor 310 and the second resistor 320 are provided as the digital variable resistors.

As shown in FIG. 11, the first resistor 310 according to one embodiment of the present invention is the digital potentiometer for dynamic charging current (ICHG) control, which serves as a rheostat. Further, the second resistor 320 is the digital potentiometer for dynamic charging voltage (VCHG) control, which serves as a rheostat.

As described above, the charging device 10 according to one embodiment of the present invention employs the first resistor 310 and the second resistor 320 for CC-CV charging control. That is, according to one embodiment, the first resistor 310 performs constant current control for the charging current, and the second resistor 320 performs constant voltage control for the charging voltage.

The use of the digital potentiometers as substitutes for precision resistors involves correcting the resistance error attributed to systematic and/or random mismatch errors in integrated circuit manufacturing process variations, reaching 20% or higher resistance variation, as well as temperature-induced drift error on the order of 35-50 parts per million (ppm).

To correct for such errors, input and output voltage nodes of resistor dividers are sampled with available analog to digital conversion (ADC) channels, and the controller 200 calculates potentiometer codes adjusted to compensate for the observed resistance error.

The error correction may be variously achieved. According to one embodiment, a simple linear scaling factor (or a linear scaling coefficient) may be applied so as to address deviations from expected charging characteristics. According to another embodiment, polynomial curve fitting for more various uses may be taken into account. Further, according to still another embodiment, charge programming circuitry response may be characterized through more various methods of operating conditions and factory-calibrate before production releases.

Below, referring to FIG. 11, a process of calculating a digital code as an n-bit code output from the controller 200 to control the first resistor 310 and the second resistor 320 will be described by way of example.

The controller 200 of the battery charging device 10 according to one embodiment shown in FIG. 11 may output a control signal including a first digital code ICTL_RHEOSTAT_CODE and a second digital code VCTL_RHEOSTAT_CODE to the first resistor 310 and the second resistor 320 through the interface 230, respectively. The output first digital code adjusts charging current settings for the first resistor 310, and the second digital code adjusts charging voltage settings for the second resistor 320.

According to one embodiment, a process of sequentially deriving an expression 5 for calculating the first digital code ICTL_RHEOSTAT_CODE is as follows.

First, the value of the first digital code ICTL_RHEOSTAT_CODE in the first resistor 310 is given to satisfy the following expression 1.

$$\text{ICTL\_RHEOSTAT\_CODE} = \frac{RHEO\_RES}{RHEO\_FF\_REF} * RHEO\_RESOL \quad \text{EXPRESSION 1}$$

Here, RHEO_RES is obtained by the following expression 2.

$$RHEO\_RES = \frac{TOP\_RES}{\left(\frac{VREF}{VIGHGSET} - 1\right)} \quad \text{EXPRESSION 2}$$

The following expression 3 is obtained by substituting the expression 2 into the expression 1.

$$\text{ICTL\_RHEOSTAT\_CODE} = \frac{TOP\_RES}{RHEO\_FS\_REF + \left(\frac{VREF}{VIGHGSET} - 1\right)} * RHEO\_RESOL \quad \text{EXPRESSION 3}$$

Here, VIGHGSET satisfies the following expression 4.

$$VICHOSET\text{-}ICHO*RSNS*CURR\_GAIN \quad \text{EXPRESSION 4}$$

Then, the expression 4 is substituted into the expression 3, and thus an expression 5 is derived.

$$\text{ICTL\_RHEOSTAT\_CODE} = \frac{RHEO\_RESOL * TOP\_RES}{RHEO\_FS\_RES + \left(\frac{VREF}{ICHG*RSNS*CURR\_GAIN} - 1\right)} \quad \text{EXPRESSION 5}$$

Where, RHEOSOL_RESOL has a predetermined bit value (i.e. n-bit resolution) given for setting the charging current, TOP_RES is a resistance per upper static resistor (R1) 311 of the first resistor 310, RHEO_FS_RES is an end-to-end resistance of the first resistor 310, VREF is a reference voltage of the charger 100, ICHG is a target charging current, RSNS is a current sense resistance, and CURR_GAIN is a current sense amplifier gain.

The reference voltage VREF may be applied through a terminal VREF of the charger 100 (312). The target charging current ICHG may be output from the charger 100 to the battery 20 under control of the controller 200 (313), and the target value may be adjusted in response to the settings of the first resistor 310.

The current sense resistance RSNS corresponds to a resistance of the resistor (R3) 314. The current sense amplifier gain CURR_GAIN is applied through terminals, i.e. SENSE+ and SENSE− of the charger 100 (315).

An example of the set parameter values are as shown in the following table 1.

TABLE 1

| Parameter | Value | Unit |
|---|---|---|
| RHEO_RESOL | 1024 | bits |
| TOP_RES | 3300 | ohms |
| RHEO_FS_RES | 20000 | ohms |
| VREF | 2 | V |
| ICHG | 10 | A |
| RSNS | 0.005 | ohms |
| CURR_GAIN | 30 | V/V |
| ICTL_RHEOSTAT_CODE | 507 | decimal code |
| RHEO_RES | 9900 | ohms |

In result, the first digital code ICTL_RHEOSTAT_CODE calculated using the expression 5 according to one embodiment is set to 507, and the first resistor 310 has a resistance of 9900 ohms.

Further, a process of deriving an expression 8 for calculating the second digital code VCTL_RHEOSTAT_CODE is as follows.

First, the value of the second digital code VCTL_RHEOSTAT_CODE in the second resistor 320 is given to satisfy the following expression 6.

$$\text{VCTL\_RHEOSTAT\_CODE} = \frac{\text{RHEO\_REF}}{\text{RHEO\_FS\_RES}} * \text{RHEO\_RESOL} \quad \text{EXPRESSION 6}$$

Here, RHEO_RES is obtained by the following expression 7.

$$\text{RHEO\_RES} = \frac{\text{TOP\_RES}}{\left(\frac{\text{VCHG}}{\text{VFB}} - 1\right)} \quad \text{EXPRESSION 7}$$

Then, the expression 7 is substituted into the expression 6, and thus the following expression 8 is derived.

$$\text{VCTL\_RHEOSTAT\_CODE} = \frac{\text{RHEO\_RESOL} * \text{TOP\_RES}}{\text{RHEO\_FS\_RES} + \left(\frac{\text{VCHG}}{\text{VFB}} - 1\right)} \quad \text{EXPRESSION 8}$$

Where, RHEOSOL_RESOL has a predetermined n-bit resolution given for setting the charging voltage, TOP_RES is a resistance per upper static resistor (R2) 321 of the second resistor 320, RHEO_FS_RES is an end-to-end resistance of the second resistor 320, VFB is a feedback voltage of the charger 100, and VCHG is a target charging voltage.

The feedback voltage VFB may be applied through a terminal VFB of the charger 100 (322). The target charging voltage VCHG may be applied from the charger 100 to the battery 20 under control of the controller 200 (323), and the target value may be adjusted in response to settings of the second resistor 320.

An example of the set parameter values are as shown in the following table 2.

TABLE 2

| Parameter | Value | Unit |
|---|---|---|
| RHEO_RESOL | 1024 | bits |
| TOP_RES | 32000 | ohms |
| RHEO_FS_RES | 20000 | ohms |
| VCHG | 4.4 | V |
| VFB | 1.21 | V |
| VCTL_RHEOSTAT_CODE | 621 | decimal code |
| RHEO_RES | 12138 | ohms |

In result, the second digital code VCTL_RHEOSTAT_CODE calculated using the expression 8 according to one embodiment is set to 621, and the second resistor 320 has a resistance of 12138 ohms.

Meanwhile, the first digital code ICTL_RHEOSTAT_CODE and the second digital code VCTL_RHEOSTAT_CODE calculated by the expression 5 and the expression 8 may be updated by the controller 100 for the foregoing error correction described with reference to FIGS. 3 to 6 and FIGS. 7 to 10.

According to one embodiment, a process of sequentially deriving the expression 14 and the expression 15 for updating the first digital code is as follows.

Below, ICTL_RHEO_OLD is defined as an original or initial first digital code before the correction, and ICTL_RHEO_NEW is defined as an updated first digital code after the correction.

First, the first digital code ICTL_RHEOSTAT_CODE is given to satisfy the following expression 9 in the first resistor 310.

$$\text{ICTL\_RHEOSTAT\_CODE} = \frac{\text{RHEO\_RES}}{\text{RHEO\_FS\_REF}} * \text{RHEO\_RESOL} \quad \text{EXPRESSION 9}$$

Here, RHEO_RES may be obtained by the following expression 10.

$$\text{RHEO\_RES} = \frac{\text{TOP\_RES}}{\left(\frac{\text{VREF}}{\text{VIGHGSET}} - 1\right)} \quad \text{EXPRESSION 10}$$

The expression 10 is substituted into the expression 9, and thus an expression 11 is obtained as follows.

$$\text{ICTL\_RHEOSTAT\_CODE} = \frac{\text{TOP\_REF}}{\text{RHEO\_FS\_RES} + \left(\frac{\text{VREF}}{\text{VIGHGSET}} - 1\right)} * \text{RHEO\_RESOL} \quad \text{EXPRESSION 11}$$

Here, VIGHGSET is given to satisfy the following expression 12.

$$\text{VICHOSET} = \text{ICHO} * \text{RSNS} * \text{CURR\_GAIN} \quad \text{EXPRESSION 12}$$

Further, the expression 12 is substituted into the expression 11, and thus an expression 13 is obtained as follows.

$$ICTL\_RHEO\_OLD = \frac{RHEO\_RESOL * TOP\_RES}{RHEO\_FS\_RES + \left(\frac{VREF}{ICHG * RSNS * CURR\_GAIN} - 1\right)} \quad \text{EXPRESSION 13}$$

Where, RHEOSOL_RESOL has a predetermined n-bit resolution given for setting the charging voltage, TOP_RES is a resistance per upper static resistor (R1) 311 of the first resistor 310, RHEO_FS_RES is an end-to-end resistance of the first resistor 310, VREF is a reference voltage of the charger 100, ICHG is a target charging current, RSNS is a current sense resistance, and CURR_GAIN is a current sense amplifier gain.

The reference voltage VREF may be applied through a terminal VREF of the charger 100 (312). The target charging current ICHG may be output from the charger 100 to the battery 20 under control of the controller 200 (313), and the target value may be adjusted in response to the settings of the first resistor 310.

The current sense resistance RSNS corresponds to a resistance of the resistor (R3) 314. The current sense amplifier gain CURR_GAIN is applied through terminals, i.e. SENSE+ and SENSE− of the charger 100 (315).

The hitherto described process corresponds to the process of deriving the first digital code using the expression 5.

Then, the first digital code is corrected, i.e. updated using the following expressions 14 and 15.

$$\text{If } \frac{VREF\_MEAS}{VICHG\_MEAS} < \frac{VREF}{VICHGSET}, \quad \text{EXPRESSION 14}$$

$$ICTL\_RHEO\_NEW = ICTL\_RHEO\_OLD * \left(1 + \left(\frac{VICHGSET}{VREF} * \frac{VREF\_MEAS}{VICHG\_MEAS}\right)\right) + 1$$

Here, VREF_MEAS is a measured reference voltage, VICHG_MEAS is a measured charging voltage, VREF is a set reference voltage, and VICHGSET is a set charging voltage. That is, the expression 14 refers to a case that a ratio (Meas_Gain) of the measured reference voltage and the measured charging voltage is compared with a ratio (Ideal_Gain) of the set reference voltage and the set charging voltage, and the resistance of the first resistor 310 is increased when Ideal_Gain is greater than Meas_Gain.

The expression 14 may be applied to the under-programmed case described with reference to FIGS. 3 to 6.

$$\text{If } \frac{VREF\_MEAS}{VICHG\_MEAS} > \frac{VREF}{VICHGSET}, \quad \text{EXPRESSION 15}$$

$$ICTL\_RHEO\_NEW = ICTL\_RHEO\_OLD * \left(1 - \left(\frac{VICHGSET}{VREF} * \frac{VREF\_MEAS}{VICHG\_MEAS}\right)\right) + 1$$

Here, VREF_MEAS is a measured reference voltage, VICHG_MEAS is a measured charging voltage, VREF is a set reference voltage, and VICHGSET is a set charging voltage. That is, the expression 15 refers to a case that a ratio (Meas_Gain) of the measured reference voltage and the measured charging voltage is compared with a ratio (Ideal_Gain) of the set reference voltage and the set charging voltage, and the resistance of the first resistor 310 is decreased when Meas_Gain is greater than Ideal_Gain.

The expression 15 may be applied to the over-programmed case described with reference to FIGS. 7 to 10.

The expression 14 corresponds to positive correction, and the expression 15 corresponds to negative correction.

The values of the parameters of the first resistor 310 set as shown in the table 1 may be corrected as shown in tables 3 and 4 in accordance with the expression 14 and the expression 15.

TABLE 3

| Parameter | Value | Unit |
| --- | --- | --- |
| VREF_MEAS | 2 | V |
| VICHGMEAS | 1 | V |
| VICHG_MEAS/VREF_MEAS | 0.5 | |
| VICHG_SET/VREF | 0.75 | |
| ICTL_RHEOSTAT_NEW | 1268 | decimal code |
| RHEO_RES_NEW | 24769.53 | ohms |

In result, the first digital code is updated to 1268 by the positive correction according to one embodiment, and thus the resistance of the first resistor 310 is changed (increased) from 9900 ohms to 24769.53 ohms.

TABLE 4

| Parameter | Value | Unit |
| --- | --- | --- |
| VREF_MEAS | 2 | V |
| VICHGMEAS | 2 | V |
| VICHG_MEAS/VREF_MEAS | 1 | |
| VICHG_SET/VREF | 0.75 | |
| ICTL_RHEOSTAT_NEW | 128 | decimal code |
| RHEO_RES_NEW | 2494.531 | ohms |

In result, the first digital code is updated to 128 by the negative correction according to one embodiment, and thus the resistance of the first resistor 310 is changed (decreased) from 9900 ohms to 2494.531 ohms.

According to one embodiment, a process of sequentially deriving the expression 19 and the expression 20 for updating the second digital code is as follows.

Below, VCTL_RHEO_OLD is defined as a second digital code before the correction, and VCTL_RHEO_NEW is defined as a second digital code after the correction.

First, the second digital code VCTL_RHEOSTAT_CODE is given to satisfy the following expression 16 in the second resistor 320.

$$VCTL\_RHEOSTAT\_CODE = \frac{RHEO\_RES}{RHEO\_FS\_RES} * RHEO\_RESOL \quad \text{EXPRESSION 16}$$

Here, RHEO_RES may be obtained by the following expression 17.

$$RHEO\_RES = \frac{TOP\_RES}{\left(\frac{VCHO}{VPE} - 1\right)} \quad \text{EXPRESSION 17}$$

The expression 17 is substituted into the expression 16, and thus an expression 18 is derived.

$$\text{VCTL\_RHEOSTAT\_OLD} = \frac{\text{RHEO\_RESOL} * \text{TOP\_RES}}{\text{RHEO\_FS\_RES} * \left(\frac{VCHO}{VPE} - 1\right)} \quad \text{EXPRESSION 18}$$

Where, RHEOSOL_RESOL has a predetermined n-bit resolution given for setting the charging voltage, TOP_RES is a resistance per upper static resistor (R2) 321 of the second resistor 320, RHEO_FS_RES is an end-to-end resistance of the second resistor 320, VFB is a feedback voltage of the charger 100, and VCHG is a target charging voltage.

The feedback voltage VFB may be applied through a terminal VFB of the charger 100 (322). The target charging voltage VCHG may be applied from the charger 100 to the battery 20 under control of the controller 200 (323), and the target value may be adjusted in response to settings of the second resistor 320.

The hitherto described process corresponds to the process of deriving the second digital code using the expression 8.

Then, the second digital code is corrected, i.e. updated using the following expressions 19 and 20.

$$\text{If } \frac{\text{VCHG\_MEAS}}{\text{VFB\_MEAS}} < \frac{VCHG}{VFB}, \quad \text{EXPRESSION 19}$$

$$\text{VCTL\_RHEO\_NEW} = \text{VCTL\_RHEO\_OLD} * \left(1 + \left(\frac{VFB}{VCHG} * \frac{\text{VCHG\_MEAS}}{\text{VFB\_MEAS}}\right)\right) + 1$$

Here, VCHG_MEAS is a measured charging voltage, VFB_MEAS is a measured feedback voltage, VCHG is a set charging voltage, and VFB is a set feedback voltage. That is, the expression 19 refers to a case that a ratio (Meas_Gain) of the measured charging voltage and the measured feedback voltage is compared with a ratio (Ideal_Gain) of the set charging voltage and the set feedback voltage, and the resistance of the second resistor 320 is increased when Ideal_Gain is greater than Meas_Gain.

The expression 19 may be applied to the under programmed case described with reference to FIGS. 3 to 6.

$$\text{If } \frac{\text{VCHG\_MEAS}}{\text{VFB\_MEAS}} > \frac{VCHG}{VFB}, \quad \text{EXPRESSION 20}$$

$$\text{VCTL\_RHEO\_NEW} = \text{VCTL\_RHEO\_OLD} * \left(1 - \left(\frac{VFB}{VCHG} * \frac{\text{VCHG\_MEAS}}{\text{VFB\_MEAS}}\right)\right) + 1$$

Here, VCHG_MEAS is a measured charging voltage, VFB_MEAS is a measured feedback voltage, VCHG is a set charging voltage, and VFB is a set feedback voltage. That is, the expression 20 refers to a case that a ratio (Meas_Gain) of the measured charging voltage and the measured feedback voltage is compared with a ratio (Ideal_Gain) of the set charging voltage and the set feedback voltage, and the resistance of the second resistor 320 is decreased when Meas_Gain is greater than Ideal_Gain.

The expression 20 may be applied to the over-programmed case described with reference to FIGS. 7 to 10.

The expression 19 corresponds to positive correction, and the expression 20 corresponds to negative correction.

The values of the parameters of the second resistor 320 set as shown in the table 2 may be corrected as shown in tables 5 and 6 in accordance with the expression 19 and the expression 20.

TABLE 5

| Parameter | Value | Unit |
|---|---|---|
| VCHG_MEAS | 4.4 | V |
| VFB_MEAS | 1.1 | V |
| VFB_MEAS/VCHG_MEAS | 0.25 | |
| VFB/VCHG | 0.275 | |
| ICTL_RHEOSTAT_NEW | 1306 | decimal code |
| RHEO_RES_NEW | 25509 | ohms |

In result, the second digital code is updated to 1306 by the positive correction according to one embodiment, and thus the resistance of the second resistor 320 is changed (increased) from 12138 ohms to 25509 ohms.

TABLE 6

| Parameter | Value | Unit |
|---|---|---|
| VCHG_MEAS | 4.4 | V |
| VFB_MEAS | 2.2 | V |
| VFB_MEAS/VCHG_MEAS | 0.5 | |
| VFB/VCHG | 0.275 | |
| ICTL_RHEOSTAT_NEW | 589 | decimal code |
| RHEO_RES_NEW | 11499 | ohms |

In result, the second digital code is updated to 589 by the negative correction according to one embodiment, and thus the resistance of the second resistor 320 is changed (decreased) from 12138 ohms to 11499 ohms.

The expressions 14 and 15 and the expressions 19 and 20 employ the equation for linear compensation, i.e. y=mx+b. Here, y corresponds to an updated digital code, and x and b correspond to an original digital code. Further, m corresponds to a scaling factor.

Therefore, the equation can be rewritten as New Code=Old Code*(1+−Scaling Factor)+1, in which the last term of "+1" is added since "0" instead of "1" is typically referred to as a first code by a digital device.

The method of using the expressions 14 and 15 and the expressions 19 and 20 to correct the first digital code and the second digital code may further provide maintenance of a charging accuracy by combination with continuous real-time monitoring for subsequent error correction will provide.

Specifically, the controller 200 monitors the charging characteristics of the battery during the charging cycle of the battery 20. Here, the controller 200 may monitor the charging characteristics of the battery at intervals of predetermined time, and may for example obtain a reference voltage, a charging voltage, a feedback voltage and the like as monitoring results. Further, the first digital code to be output to the first resistor 310 and the second digital code to be output to the second resistor 320 are corrected in accordance with the monitored charging characteristics of the battery.

Thus, the preservation of the charging accuracy given in real-time is made possible with use of system ADC channels for monitoring charge configuration and continuously applying corrective feedback.

According to the foregoing embodiment of the present invention, it was described by way of example that the digital code is updated based on a linear scaling factor, but the present invention is not limited thereto. That is, the present invention may employ various expressions for updating the digital code by sensing the charging characteristics of the battery and correcting the error besides the expressions 14 and 15 and the expressions 19 and 20.

As compared with the conventional analog-controlled battery charging, the digital programmability techniques for the variable resistor 300 according to the foregoing embodiment of the present invention provide a low cost, accurate, and highly flexible. Further, the potentiometers or the like highly integrated, digitally-controlled variable resistors are used to improve a noise problem since there are no needs of components for PWM-based, RC-filtered programming pulse and flexibility constraints.

Below, a charging control method of the battery charging device 10 according to embodiments of the present invention will be described with reference to the accompanying drawings.

Figure 12:
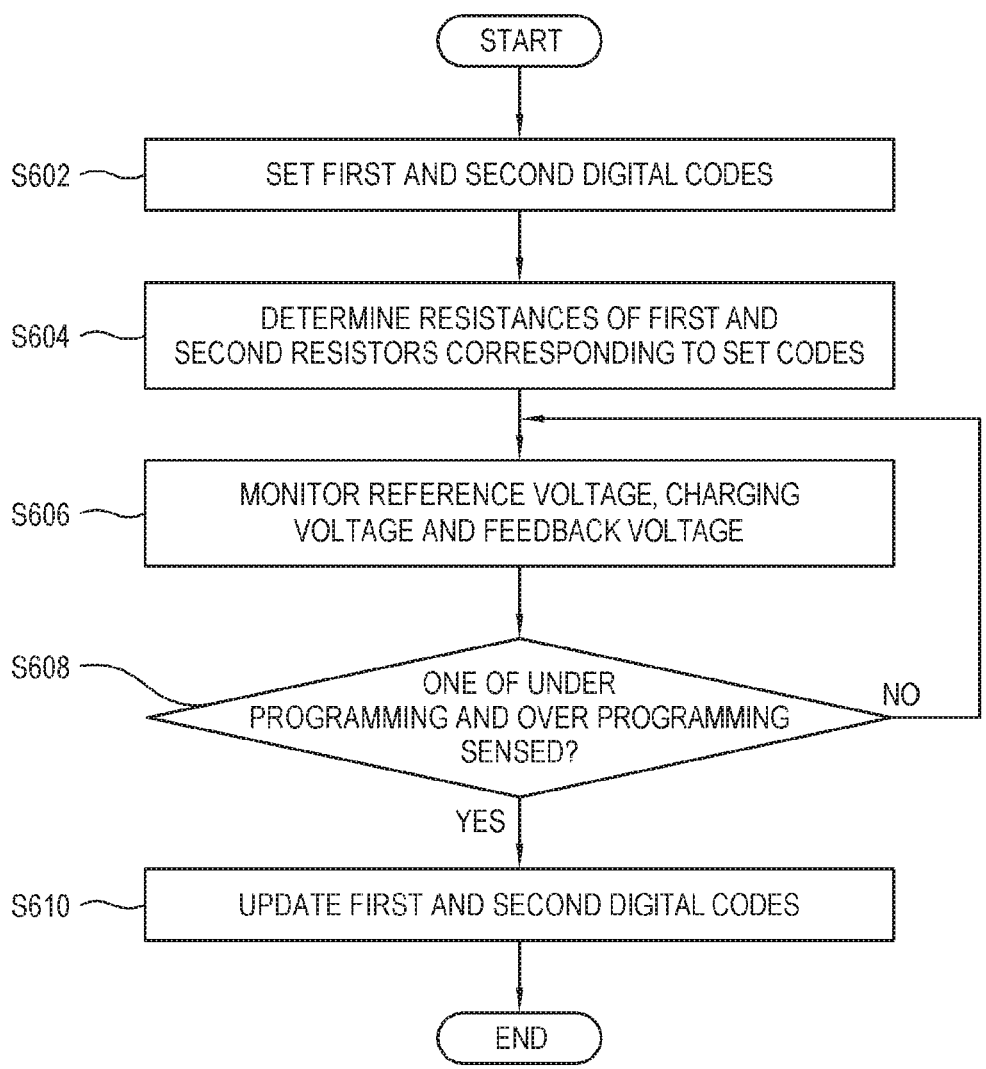
FIG. 12 is a flowchart of showing a battery charging control method according to one embodiment of the present invention.

FIG. 12 is a flowchart of showing a charging control method according to one embodiment of the present invention.

As shown in FIG. 12, the controller 200 may set a first digital code and a second digital code to be respectively output to the first resistor 310 and the second resistor 320 (S602). Here, the first digital code may be set based on the expression 5, and the second digital code may be set based on the expression 8.

Resistances of the first resistor 310 and the second resistor 320 are respectively determined corresponding to the first digital code and the second digital code set in the step S602 (S604). The controller 200 controls the battery 20 to be charged with power received from the charger 100, in which the charging capacity of the battery 20 may be adjusted by the resistances of the first resistor 310 and the second resistor 320 determined in the step S604.

The controller 200 monitors a reference voltage VREF, a charging voltage VCHG and a feedback voltage VFB while controlling the charge of the battery 20 in the step S604 (S606).

As a result from monitoring in the step S606, one of under-programming and over-programming may be sensed (S608). Here, the under-programming may have a problem of prolonged charging time since its charging voltage/capacity is lower than that of a normal case as shown in FIGS. 3 to 6, and the over-programming may have a problem of breaking the charging device 10 since its charging voltage/capacity is higher than that of a normal case as shown in FIGS. 9 to 10.

When one of under-programming and over-programming is sensed in the step S608, the controller 200 corrects, i.e. updates the first digital code and the second digital code, and outputs control signals including the updated first and second digital codes to the first resistor 310 and the second resistor 320, respectively (S610). Here, the updated first digital code may be determined using a corresponding one of the expression 14 and the expression 15, and the updated second digital code may be determined using a corresponding one of the expression 19 and the expression 20.

FIG. 12 illustrates an example that the first resistor 310 and the second resistor 320 are all materialized by the digital variable resistors, and the controller 200 sets and corrects both the first digital code and the second digital code, but this example merely corresponds to one embodiment of the present invention.

In other words, according to another embodiment of the present invention, one of the first resistor 310 and the second resistor 320 may be the digital variable resistor, and the other one may be a fixed register of which resistance is invariable. Therefore, the controller 200 may be configured to set, determine and update one of the first digital code and the second digital code, which corresponds to the variable resistor, in the steps S602, S604 and S610. Further, the controller 200 may be configured to monitor the reference voltage and the charging voltage (when the first resistor is the variable resistor), or monitor the charging voltage and the feedback voltage (when the second resistor is the variable resistor) in the step S606.

Features according to many embodiments of the present invention may be partially or entirely united or combined to each other, and technically variously interlocked and driven as fully understood by a person having an ordinary skill in the art, and the embodiments may be realized independently of or together with each other.

Like this, according to one embodiment of the present invention, at least one digital variable resistor 310 or 320 for adjusting a charging amount is provided in a charging device 10 for charging a battery 20, thereby providing a battery charging device 10 for flexible and adaptive charging control.

Further, actual charging in a charging process is monitored to correct a digital code output to the digital variable resistor 310 or 320 and change and control a charging time and a charging capacity, thereby handling under-programming and over-programming situations in real time.

Accordingly, it is possible to prevent the charging time from being unnecessarily prolonged, or the charging device 100 from being broken due to repeatedly applied high voltage.

The charging control according to the foregoing embodiments of the present invention may be utilized for various charging devices such as a portable charger, a computer chargeable through USB connection, and the like that includes the digital variable resistor and the processor for charging control.

Meanwhile, the foregoing exemplary embodiments of the present invention may be realized by a computer readable recording medium. The computer readable recording medium includes a storage medium for storing data readable by a transmission medium and a computer system. The transmission medium may be achieved by a wired/wireless network through which computer systems are linked to one another.

The foregoing exemplary embodiments may be realized by hardware and combination between hardware and software. As the hardware, the processor 200 may include a nonvolatile memory in which a computer program is stored as the software, a RAM in which the computer program stored in the nonvolatile memory is loaded, and a CPU for executing the computer program loaded in the RAM. The nonvolatile memory may include a hard disk drive, a flash memory, a ROM, CD-ROMs, magnetic tapes, a floppy disc, an optical storage, a data transmission device using the Internet, etc., but is not limited thereto. The nonvolatile memory is a kind of computer-readable recording medium in which a program readable by a computer of the present invention is recorded.

The computer program is a code that is read and executed by the CPU, and includes codes for performing the operations of the processor 300 such as the operations S602 to S610 as shown in FIG. 12.

The computer program may be included in an operating system provided in the charging device 10 or software including an application and/or software interfacing with an external apparatus.

Although the present invention has been shown and described through exemplary embodiments, the present invention is not limited to the exemplary embodiments and may be variously materialized within the appended claims.

REFERENCE NUMERALS

1: battery charging system
10: battery charging device
20: battery
100: charger
200: charging controller
300: variable resistor
310: first resistor
320: second resistor

The invention claimed is:

1. An electronic device, the electronic device comprising:
a charging circuit;
a battery;
a variable resistor; and
at least one processor configured to:
  identify a resistance corresponding to a digital code,
  based on the identified resistance, control the variable resistor to adjust a charging current for charging the battery,
  control the charging circuit to provide the adjusted charging current to the battery, and
  in response to identifying that the charging current is abnormal, adjust the resistance by comparing a reference charging voltage with a measured charging voltage.

2. The electronic device according to claim 1,
wherein the variable resistor comprises:
  a first resistor configured to make a charging current be subjected to constant current control; and
  a second resistor configured to make a charging voltage be subjected to constant voltage control, and
wherein the processor is configured to:
  correct a first digital code to be output to the first resistor and a second digital code to be output to the second resistor in accordance with battery charging characteristics monitored during a charging cycle of the battery; and
  update the first digital code and the second digital code based on a linear scaling factor.

3. The electronic device according to claim 2, wherein the first digital code is identified by an expression $$ICTL\_RHEOSTAT\_CODE=(RHEO\_RESOL \times TOP\_RES)/[RHEO\_FS\_RES \times \{VREF/(ICHG \times RSNS \times CURR\_GAIN)-1\}],$$

where, RHEOSOL_RESOL has a predetermined bit value given for setting a charging current, TOP_RES is a resistance per upper static resistor of the first resistor, RHEO_FS_RES is an end-to-end resistance of the first resistor, VREF is a set value of a reference voltage, ICHG is a target charging current, RSNS is a current sense resistance, and CURR_GAIN is a current sense amplifier gain.

4. The electronic device according to claim 3, wherein the identified first digital code is updated by one of an expression If VERF_MEAS/VICHG_MEAS<VREF/VICHG-SET,ICTL_RHEO_NEW=ICTL_RHEO_OLD× [1+{(VICHGSET/VREF)×(VREF_MEAS/VICHG_MEAS)}]+1 and an expression If VERF_MEAS/VICHG_MEAS>VREF/VICHG-SET,ICTL_RHEO_NEW=ICTL_RHEO_OLD× [1−{(VICHGSET/VREF)×(VREF_MEAS/VICHG_MEAS)}]+1, where, ICTL_RHEO_OLD is a first digital code before correction, ICTL_RHEO_NEW is a first digital code after correction, VREF_MEAS is a measured reference voltage, VICHG_MEAS is a measured charging voltage, VREF is a set reference voltage, and VICHGSET is a set charging voltage value.

5. The electronic device according to claim 2, wherein the second digital code is identified by an expression $$VCTL\_RHEOSTAT\_CODE=(RHEO\_RESOL \times TOP\_RES)/[RHEO\_FS\_RES \times \{(VCHG/VFB)-1\}],$$

where, RHEOSOL_RESOL has a predetermined bit value given for setting a charging current, TOP_RES is a resistance per upper static resistor of the second resistor, RHEO_FS_RES is an end-to-end resistance of the second resistor, VFB is a feedback voltage, and VCHG is a target charging voltage.

6. The electronic device according to claim 5, wherein the identified second digital code is updated by one of an expression If VCHG_MEAS/VFB_MEAS<VCHG/VFB, VCTL_RHEO_NEW=VCTL_RHEO_OLD×[1+ {(VFB/VCHG)×(VCHG_MEAS/VFB_MEAS)}]+1 and an expression If VCHG_MEAS/VFB_MEAS>VCHG/VFB, VCTL_RHEO_NEW=VCTL_RHEO_OLD×[1− {(VFB/VCHG)×(VCHG_MEAS/VFB_MEAS)}]+1, where, VCTL_RHEO_OLD is a second digital code before correction, VCTL_RHEO_NEW is a second digital code after correction, VCHG_MEAS is a measured charging voltage, VFB_MEAS is a measured feedback voltage, VCHG is a set charging voltage, and VFB is a set feedback voltage.

7. The electronic device according to claim 2, wherein at least one of the first resistor or the second resistor comprises a digital variable resistor of which resistance settings are varied depending on the digital code.

8. The electronic device according to claim 1,
wherein the variable resistor is placed on a charging path and configured to adjust a charging capacity provided from the charging circuit to the battery and have a resistance identified corresponding to a digital code received from the processor,
wherein the processor is configured to update the digital code to compensate for deviations corresponding to an abnormal increasing or decreasing charging capacity provided to the battery, based on monitoring results, and
wherein resistance settings for the variable resistor is changed in response to the update of the digital code.

9. A charging control method of an electronic device comprising a charging circuit, a battery, a variable resistor, and at least one processor, the charging control method comprising:
identifying, by the processor, a resistance corresponding to a digital code;

based on the identified resistance, controlling, by the processor, the variable resistor to adjust a charging current for charging the battery;

controlling, by the processor, the charging circuit to provide the adjusted charging current to the battery; and in response to identifying that the charging current is abnormal, adjusting, by the processor, the resistance by comparing a reference charging voltage with a measured charging voltage.

10. The charging control method according to claim 9, further comprising: correcting the digital code in accordance with battery charging characteristics monitored during a charging cycle of the battery, wherein the variable resistor comprises a first resistor and a second resistor, wherein the correcting of the digital code comprises:
making a charging current be subjected to constant current control by the first resistor, and
making a charging voltage be subjected to constant voltage control by the second resistor, and wherein the correcting of the digital code further comprises updating a first digital code to be output to the first resistor and a second digital code to be output to the second resistor based on a linear scaling factor.

11. The charging control method according to claim 10, wherein the first digital code in the identifying of the resistance is identified by an expression ICTL_RHEOSTAT_CODE=(RHEO_RESOL×TOP_RES)/[RHEO_FS_RES×{VREF/(ICHG× RSNS×CURR_GAIN)−1}], where, RHEOSOL_RESOL has a predetermined bit value given for setting a charging current, TOP_RES is a resistance per upper static resistor of the first resistor, RHEO_FS_RES is an end-to-end resistance of the first resistor, VREF is a set value of a reference voltage, ICHG is a target charging current, RSNS is a current sense resistance, and CURR_GAIN is a current sense amplifier gain.

12. The charging control method according to claim 11, wherein the identified first digital code in the correcting of the digital code is updated by one of an expression If VERF_MEAS/VICHG_MEAS<VREF/VICHGSET,ICTL_RHEO_NEW=ICTL_RHEO_OLD× [1+{(VICHGSET/VREF)×(VREF_MEAS/VICHG_MEAS)}]+1 and If VERF_MEAS/VICHG_MEAS>VREF/VICHGSET,ICTL_RHEO_NEW=ICTL_RHEO_OLD× [1−{(VICHGSET/VREF)×(VREF_MEAS/VICHG_MEAS)}]+1, where, ICTL_RHEO_OLD is a first digital code before correction, ICTL_RHEO_NEW is a first digital code after correction, VREF_MEAS is a measured reference voltage, VICHG_MEAS is a measured charging voltage, VREF is a set reference voltage, and VICHGSET is a set charging voltage value.

13. The charging control method according to claim 10, wherein the second digital code in the identifying of the resistance value is identified by an expression

VCTL_RHEOSTAT_CODE=(RHEO_RESOL×TOP_RES)/[RHEO_FS_RES×{(VCHG/VFB)−1}], where, RHEOSOL_RESOL has a predetermined bit value given for setting a charging current, TOP_RES is a resistance per upper static resistor of the second resistor, RHEO_FS_RES is an end-to-end resistance of the second resistor, VFB is a feedback voltage, and VCHG is a target charging voltage.

14. The charging control method according to claim 13, wherein the identified second digital code in the correcting of the digital code is updated by one of an expression If VCHG_MEAS/VFB_MEAS<VCHG/VFB, VCTL_RHEO_NEW=VCTL_RHEO_OLD×[1+ {(VFB/VCHG)×(VCHG_MEAS/VFB_MEAS)}]+1 and If VCHG_MEAS/VFB_MEAS>VCHG/VFB, VCTL_RHEO_NEW=VCTL_RHEO_OLD×[1− {(VFB/VCHG)×(VCHG_MEAS/VFB_MEAS)}]+1, where, VCTL_RHEO_OLD is a second digital code before correction, VCTL_RHEO_NEW is a second digital code after correction, VCHG_MEAS is a measured charging voltage, VFB_MEAS is a measured feedback voltage, VCHG is a set charging voltage, and VFB is a set feedback voltage.

15. The charging control method according to claim 10, wherein at least one of the first resistor or the second resistor comprises a digital variable resistor of which resistance settings are varied depending on the digital code, and wherein the correcting of the digital code comprises:
updating the digital code to compensate for deviations corresponding to an abnormal increasing or decreasing charging capacity provided to the battery, based on monitoring results, and
changing the resistance settings for the variable resistor in response to the update of the digital code.

* * * * *